Dec. 19, 1967 G. O. GRAVES ET AL 3,358,582
CEREAL PROCESSING MACHINE
Filed March 7, 1966 9 Sheets-Sheet 1

INVENTORS
EDWIN F. KELLEY
GEORGE O. GRAVES
BY M. A. Hobbs
ATTORNEY

Dec. 19, 1967　　G. O. GRAVES ET AL　　3,358,582
CEREAL PROCESSING MACHINE

Filed March 7, 1966　　　　　　　　　　　　　　　　9 Sheets-Sheet 3

INVENTORS
EDWIN F. KELLEY
GEORGE O. GRAVES
BY *M. A. Hobbs*
ATTORNEY

INVENTORS
EDWIN F. KELLEY
GEORGE O. GRAVES

BY *m.a.Hobbs*

ATTORNEY

Dec. 19, 1967    G. O. GRAVES ET AL    3,358,582
CEREAL PROCESSING MACHINE

Filed March 7, 1966    9 Sheets-Sheet 6

INVENTORS
EDWIN F. KELLEY
GEORGE O. GRAVES
BY *M. A. Hobbs*
ATTORNEY

United States Patent Office 3,358,582
Patented Dec. 19, 1967

3,358,582
CEREAL PROCESSING MACHINE
George O. Graves, 802 S. Carlisle, South Bend, Ind.
46619, and Edwin F. Kelley, Dallas, Tex.; said Kelley
assignor to said Graves
Filed Mar. 7, 1966, Ser. No. 532,214
11 Claims. (Cl. 99—238)

ABSTRACT OF THE DISCLOSURE

A machine for extruding and puffing cereal, having a housing with a bore therein and a screw in the bore and a head plate for extruding the cereal meal as it is pressurized by the operation of the screw in the bore. A structure is provided in the hopper or meal supply channel for continuously cooling the cereal before it is delivered to the bore.

---

The present method of extruding and puffing cereal consists in propelling cereal, such as corn meal, through a chamber by the use of a rotatable screw to and through a plurality of extrusion holes in a head plate and then cutting the extruded, puffed material into the desired length by the use of a knife passing intermittently in front of the extrusion holes. A small amount of water is normally thoroughly mixed with the meal before it is introduced into the screw chamber, and the moisturized meal, on being propelled to and into the extrusion holes, is heated sufficiently by friction and pressure to vaporize the moisture and gelatinize the starch in the meal, such that when the material is discharged from the extrusion holes, it puffs into a highly cellular, relatively brittle, finger-like product of substantially uniform consistency, referred to in the trade as "collets." The material is cut by a knife in front of the holes into the desired length, usually less than about two inches, and then, either as a successive step in the process of producing the final commercial product or by a separate process at a later time, the extruded material is given a coating of cheese or other suitable coating material, and normally salted, and then packaged for sale as snacks.

In the cereal extruding and puffing machine, the internal heat created by friction, pressure and grinding of the cereal is required to vaporize the moisture and gelatinize the starch, and must be maintained above about 212° F.; however, at times the temperature tends to rise to the point where the cereal material becomes scorched and/or fails to extrude properly through the holes in the head plate, thus producing unsatisfactory product, or failing completely to extrude. In the latter instance, the machine must be disassembled, the solidified product removed from the screw, screw chamber and extrusion holes, and the machine reassembled and again started, resulting in substantial down-time and waste product. In the past, the higher critical temperature has been controlled by cooling the head plate either by a continuous stream of air from a fan or blower or by water cooling coils in the head plate. These cooling practices, particularly the water cooling method, have required careful regulation in order to prevent overcooling to the extent that there would not be sufficient heat to vaporize the moisture and gelatinize the starch. Further, cooling by the foregoing practices has often resulted in nonuniform cooling of the meal as it reaches the head plate, and hence has resulted in a nonuniform product, i.e. some of the material being cooled to the proper temperature for producing satisfactory product, while some of the material is under-cooled and some over-cooled. It is therefore one of the principal objects of the present invention to provide a machine and method for controlling the temperature of the meal uniformly throughout, within the required temperature limits, to obtain uniformity in the consistency of the individual collets and in product from one collet to another.

Another object of the invention is to provide a machine for producing collets which has a high production rate as compared with other machines of similar size, and which permits the temperature of the meal to be effectively controlled uniformly for extended periods of machine operating time.

Still another object of the invention is to provide a machine of the aforesaid type which can be started quickly and maintained in proper operation with little or no attention, and which will automatically maintain the temperature of the meal and operating parts at the proper temperature for uninterrupted production of satisfactory collet product.

One of the important features of the present invention is the pre-cooling of the meal before it is introduced into the screw chamber, sufficiently to permit operation of the machine at a relatively high rate of production without the machine or the product being produced thereon becoming overheated. In the embodiment of the invention described in detail in the specification and shown in the drawing, the meal is pre-cooled in the hopper to a temperature sufficiently low that at relatively high preselected speeds of the screw, the friction and pressure in the screw chamber and head plate will not overheat the meal. This pre-cooling concept may be used with other cooling means, such as a system for reducing the temperatures in the screw chamber housing and in the head plate, and this concept may be used with or without the addition of water in the meal either before or after pre-cooling. One of the primary advantages of pre-cooling of the meal over the previously used cooled head plate is that the meal is uniformly cooled throughout and the increase in temperature of the meal in the machine is substantially uniform, thus resulting in uniformity in consistency of the individual collets and in the overall product produced on the machine. The extruded and puffed material thus produced is highly cellular, relatively brittle and uniform in texture, and is baked and coated with cheese or other suitable coating material, salted and packaged for sale as snack product.

Additional objects and advantages of the invention will become apparent from the following description and accompanying drawings, wherein.

Figure 1:
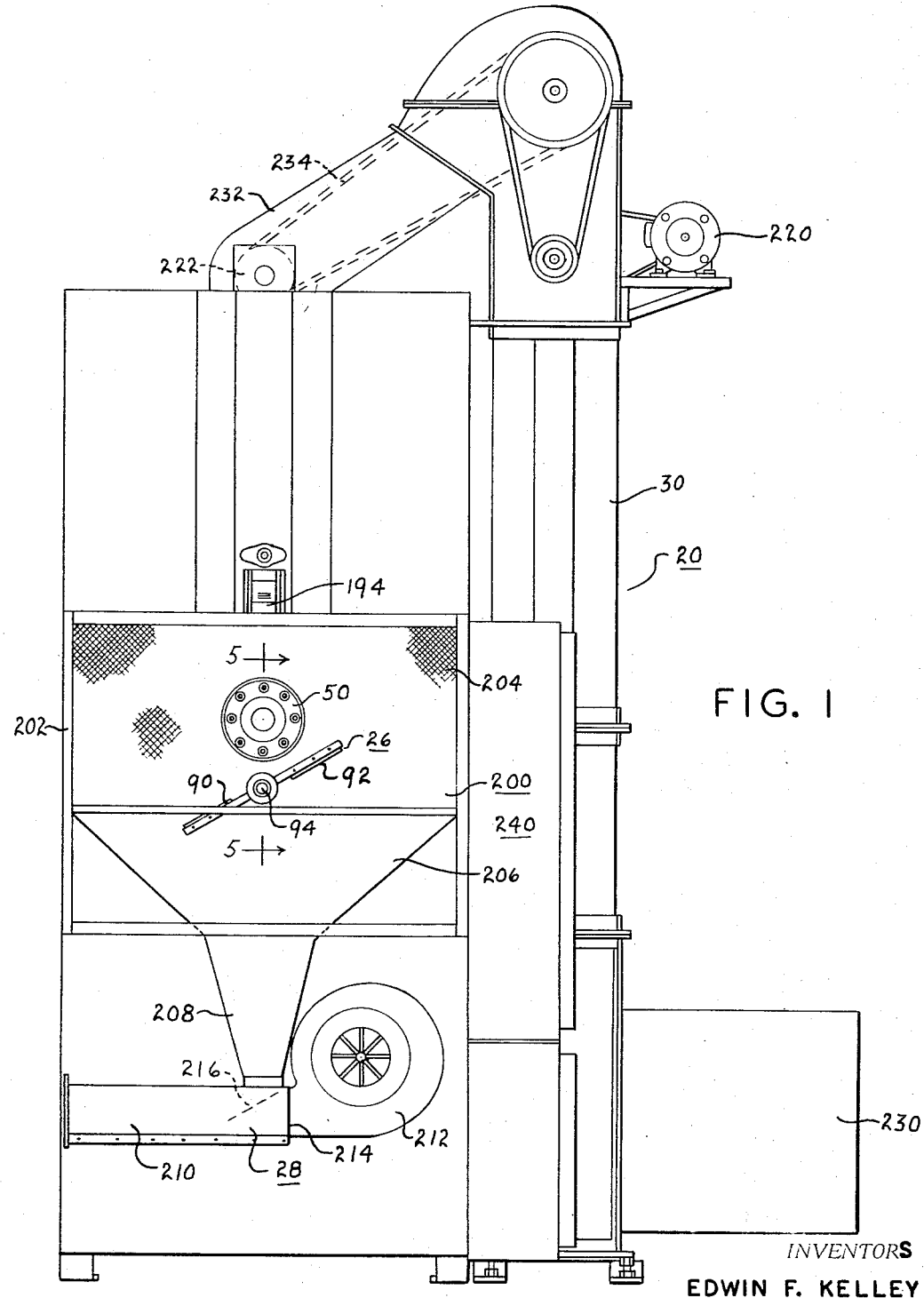
FIGURE 1 is a front elevational view of the present food processing machine.
Figure 2:
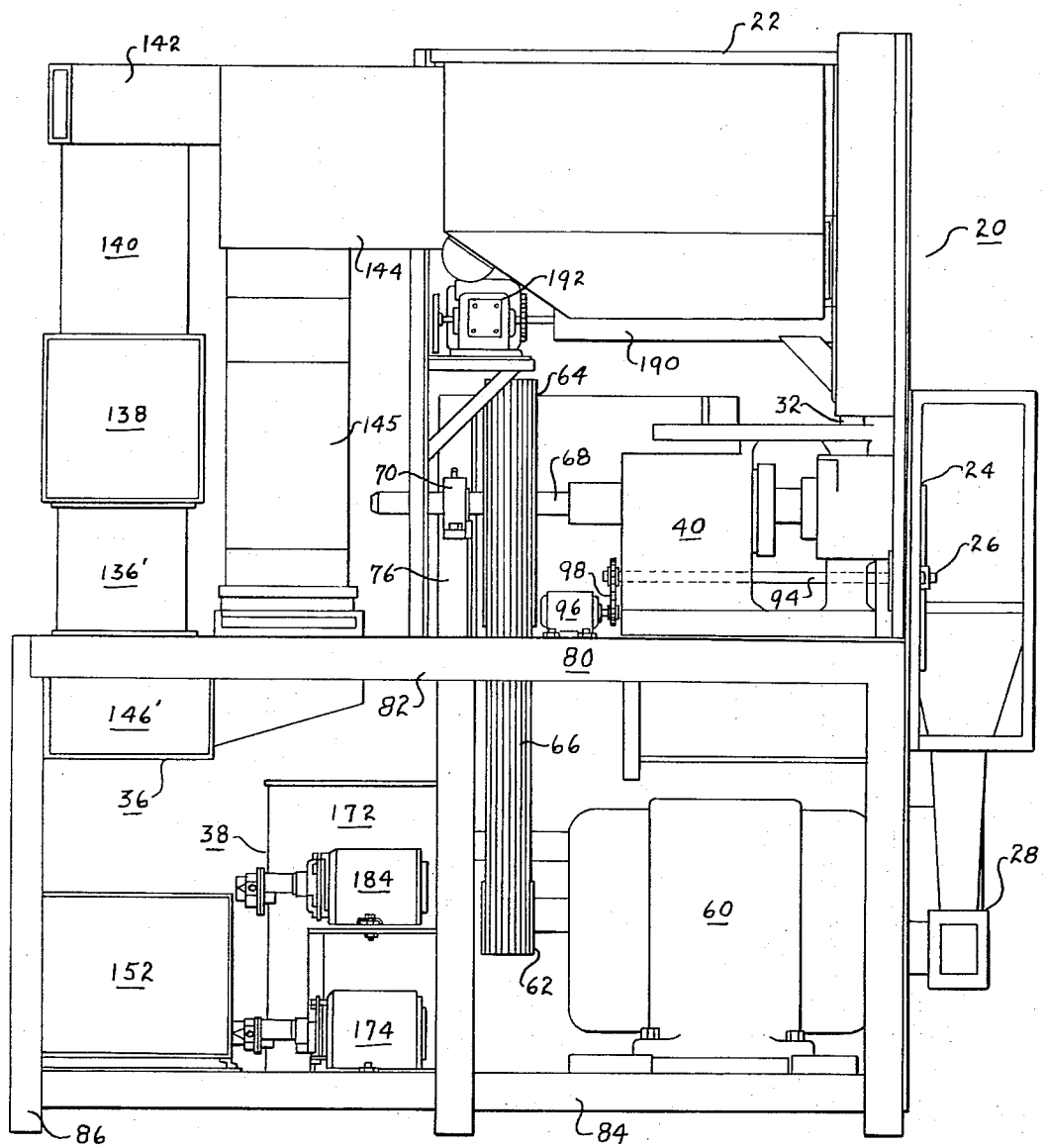
FIGURE 2 is a side elevational view of the present machine, showing the machine with the side panels removed.
Figure 3:
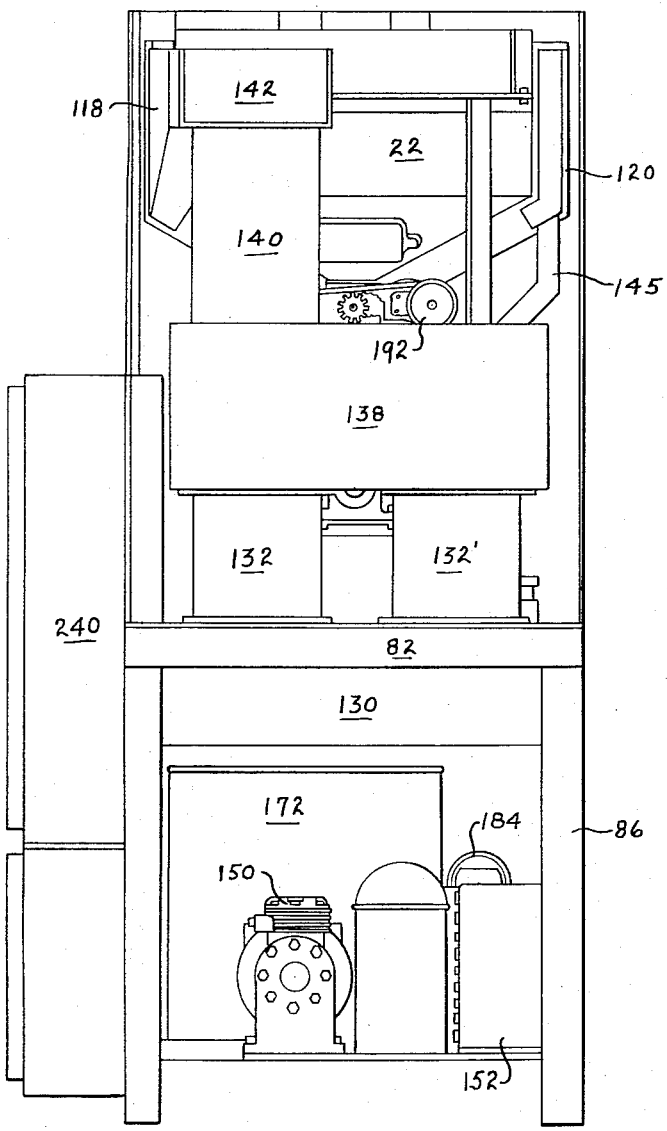
FIGURE 3 is a rear elevational view of the machine shown in the preceding figures with the panels removed and with a portion of the mechanism omitted in order to better illustrate the present mechanism.
Figure 4:
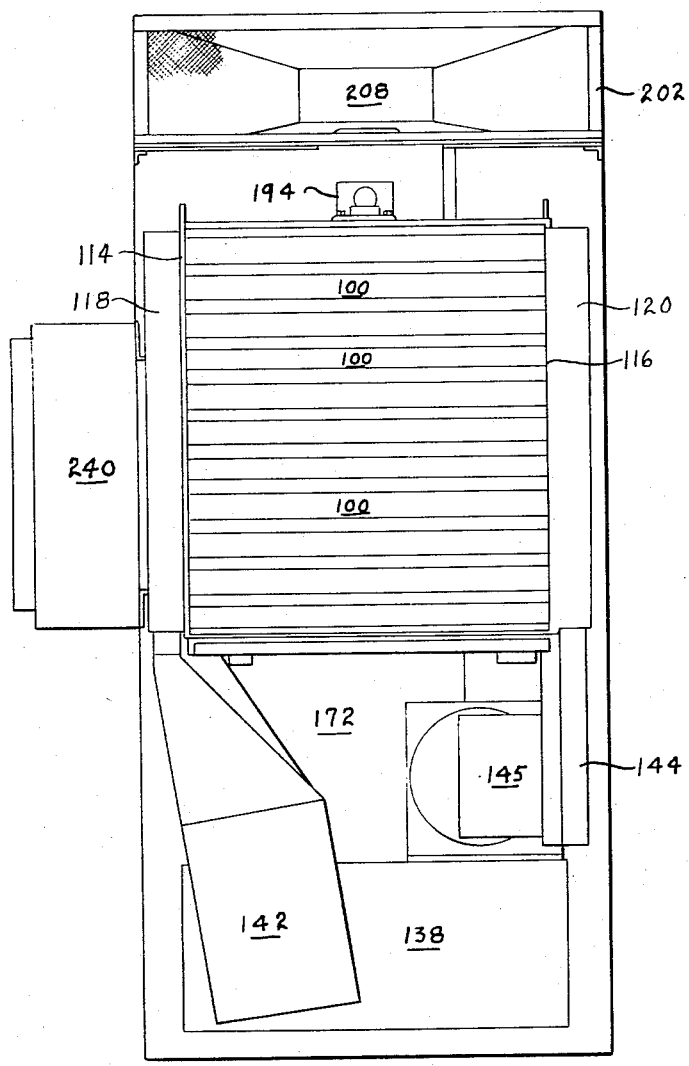
FIGURE 4 is a top plan view of the present machine with the conveyor mechanism omitted in order to show more clearly the essential parts of the machine.

Referring more specifically to the drawings, and to FIGURES 1, 2 and 3 in particular, numeral 20 designates generally the present machine having a hopper 22, extruder 24, knife mechanism 26 and conveyor mechanism 28 for removing the product produced by the extruder 24. Since the hopper is normally positioned relatively high above the floor, a conveyor mechanism 30 is preferably provided for lifting the meal to the upper end of the hopper. In the present machine, meal, for example corn meal, is placed in hopper 22, conveyed from the hopper through conduit 32 to extruder 24 where the meal is propelled by a screw to and through the extrusion holes in the head plate, and thence puffed to form the highly cellular, finger-like product. The screw propelling the meal to and through the head plate causes the temperature of the meal to rise sufficiently to pre-bake the meal, i.e. gelatinizing the starch and vaporizing the moisture in the meal. The material on leaving the holes in the head plate is cut into the desired length by knife mechanism 26 intermittently passing the outlet end of the holes, and then falls from the extruder mechanism into the conduit of conveyor 28 and is blown therefrom into a packaging machine or a suitable bin or hopper. The hopper and extruder are cooled by cooling systems indicated generally by numerals 36 and 38, respectively in FIGURE 2. The cooling systems may be of different types, for example, cooled air circulated through the hopper and water circulated through the extruder mechanism and head plate, or both the hopper and the extruder mechanism may be cooled directly by the cooling coils of the refrigerator mechanism. The concept involved in the present invention is the control of the meal temperature in the hopper prior to its entry into the screw chamber and head plate.

Figure 5:
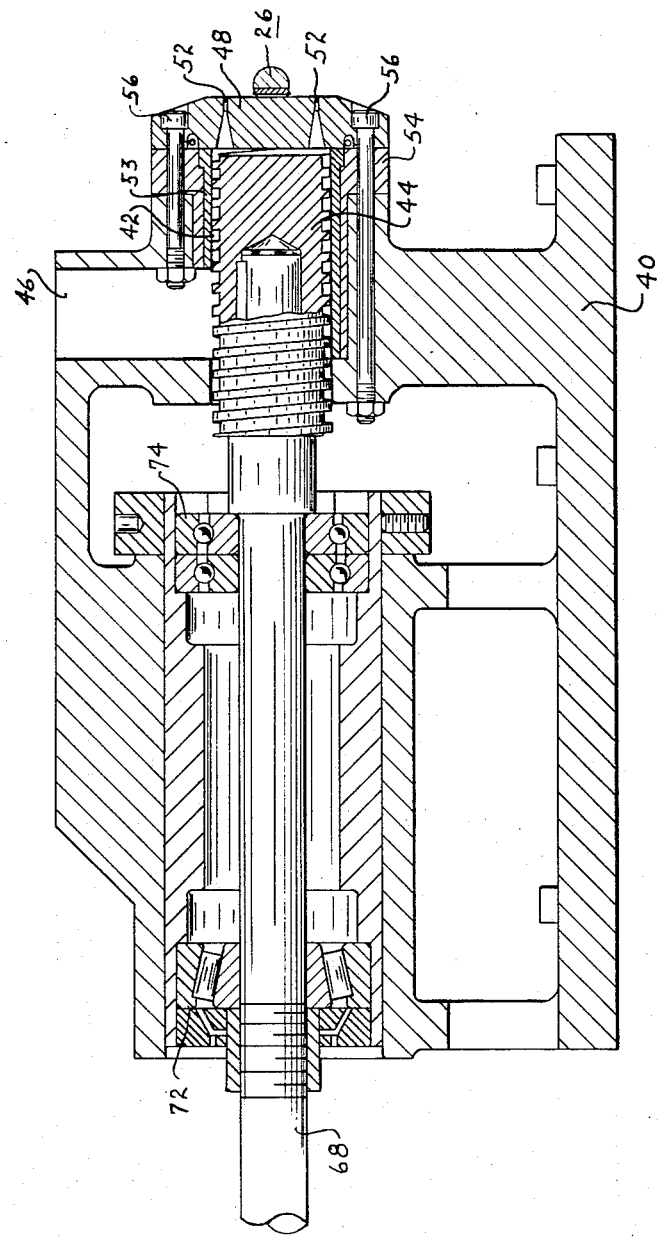
FIGURE 5 is a vertical cross sectional view of the extruder mechanism taken on line 5—5 of FIGURE 1.

The extruder mechanism shown in FIGURE 5 consists of a housing 40 having a bore or screw chamber 42, and a screw 44 in said screw chamber for propelling the meal from inlet 46 to a head plate 48, the extruder mechanism being described in detail and claimed in U.S. Patent No. 2,842,072. The head plate consists of a disc-shaped member 50 having a plurality of extrusion holes 52 extending through the plate, disposed in a circular arrangement and having inner ends communicating with the peripheral area of the screw chamber. Each hole has a conical inlet and a cylindrical portion connected to the inner end of the conical inlet and extending through the plate. The cylindrical portions may be of various lengths and of different diameters. In the extruder shown in the drawings, the screw chamber is in an insert 53 held in the housing by an adapter 54, the entire assembly of the head plate, insert and adapter being held rigidly in the housing by a plurality of bolts or screws 56 extending through the head plate into the housing. The screw 44 is driven by motor 60 through pulleys 62 and 64 and V-belts 66, pulley 62 being mounted on the motor shaft and pulley 64 being mounted on shaft 68. Shaft 68 is journalled in three separate bearing assemblies 70, 72, and 74. The latter two are mounted in the rear part of housing 40 and bearing 70 is mounted on a separate frame 76. The extruder mechanism is mounted on the main frame of the machine indicated generally by numeral 80, consisting of an intermediate frame structure 82, a lower frame structure 84, and a plurality of interconnecting vertical frame members 86, the extruder mechanism being mounted on or supported by intermediate frame structure 82 and the motor being mounted on lower frame structure 84. The details of the housing and head plate, with respect to the cooling system, will be described in greater detail hereinafter.

The meal material on being extruded through holes 52 in the head plate immediately puffs and solidifies, becoming highly cellular and relatively brittle, and forming a finger-like structure. This material is cut into the desired lengths by knife mechanism 26 consisting of blades 90 and 92 mounted on a shaft 94 which extends through the forward and rear portions of housing 40 and is driven by a gear reduction motor and chain 96 and 98, respectively.

Figure 6:
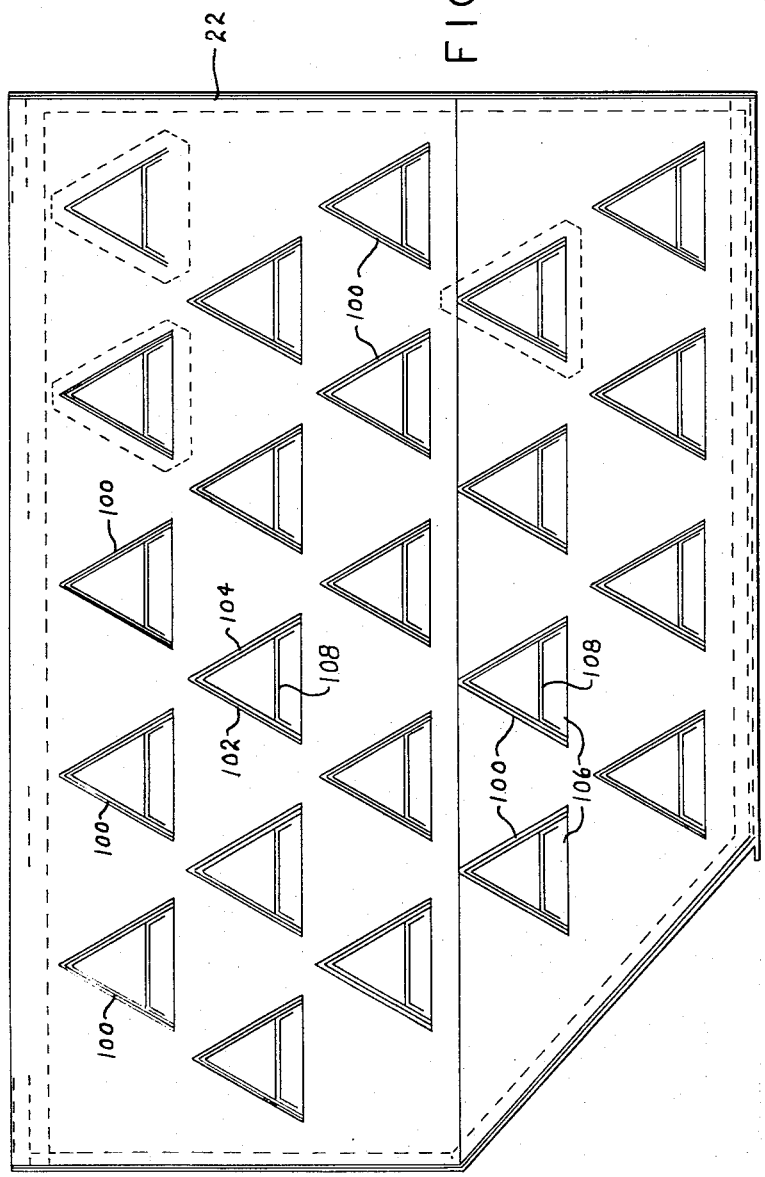
FIGURE 6 is a side elevational view of the hopper and a portion of the cooling system therefor.
Figure 8:
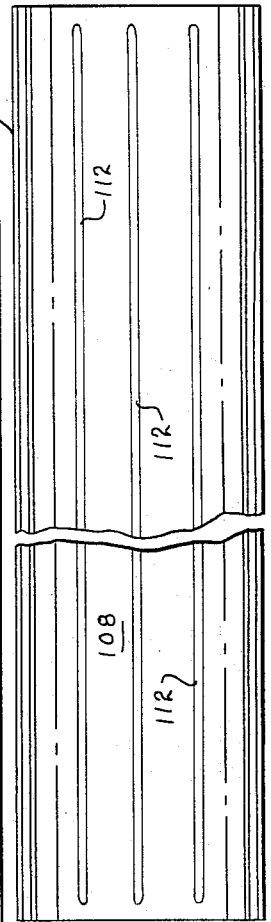
FIGURE 8 is a bottom view of the duct.
Figure 7:
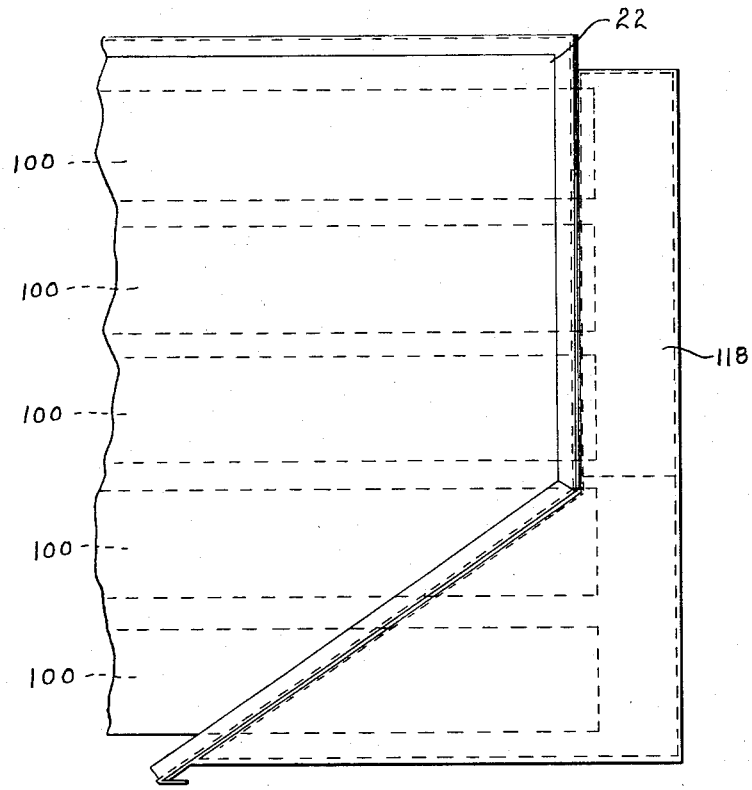
FIGURE 7 is an enlarged fragmentary elevational view of the hopper showing further details of the cooling system.
Figure 9:
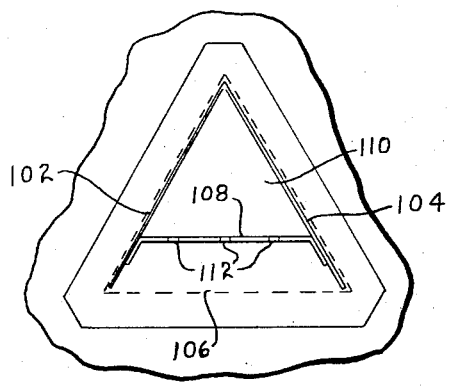
FIGURE 9 is an end elevational view of one of the hopper ducts showing the manner in which it is mounted in the hopper structure.
Figure 10:
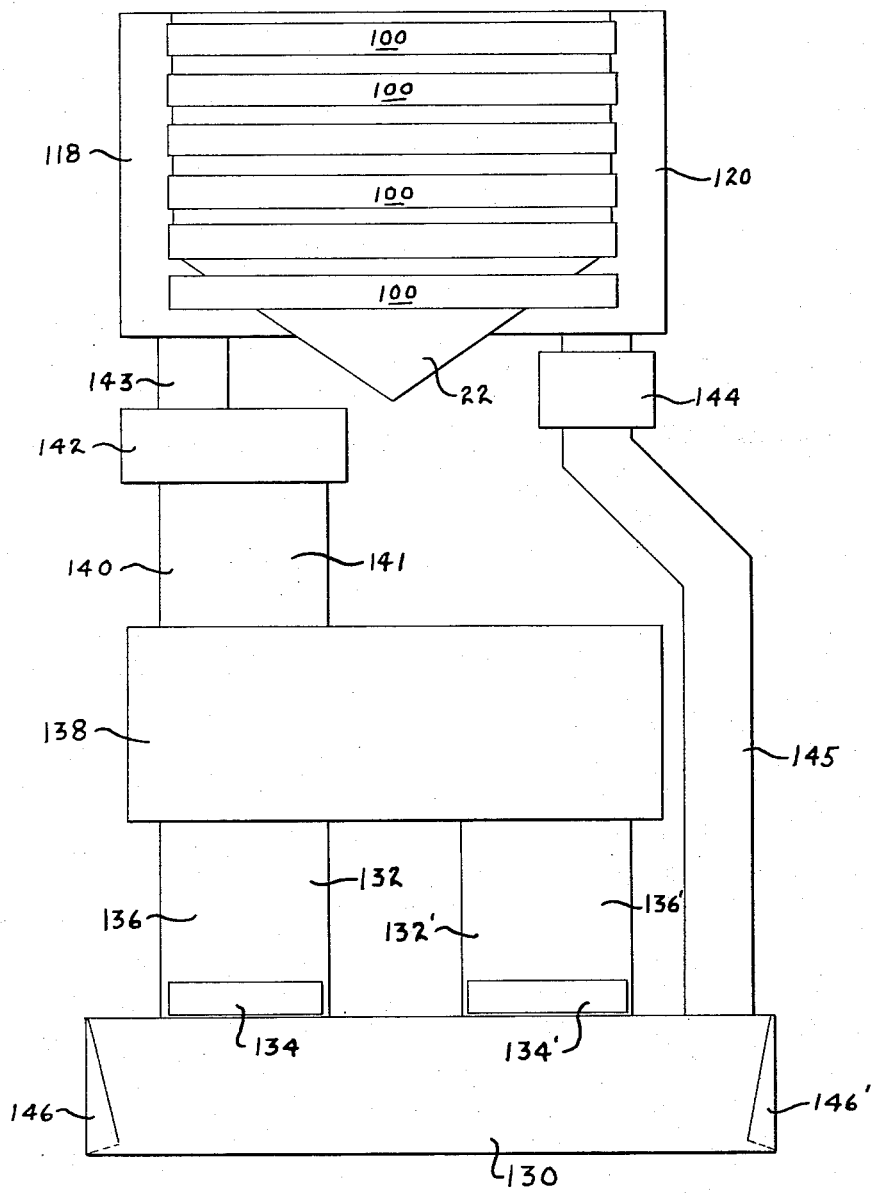
FIGURE 10 is a schematic view of the hopper cooling system, illustrating the manner in which air is cooled and circulated through the hopper.
Figure 11:
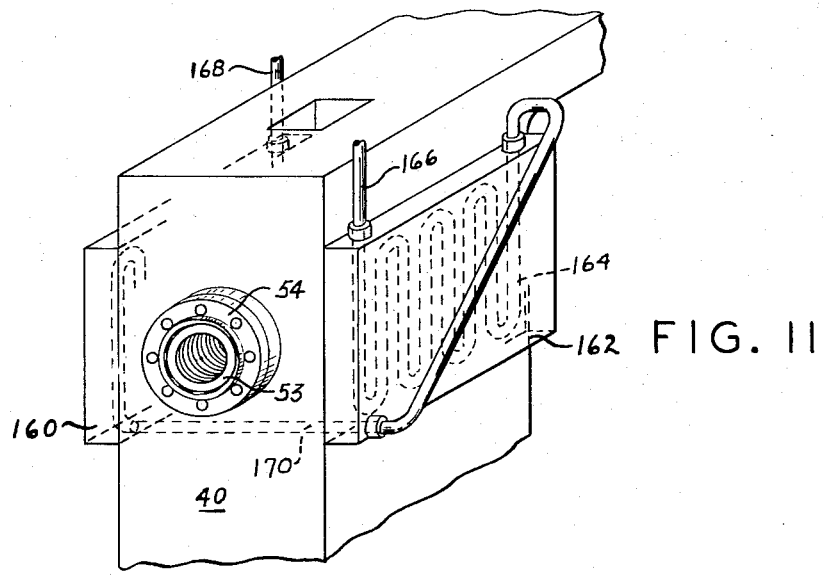
FIGURE 11 is a perspective view of the extruder housing showing schematically the cooling system therefor.
Figure 12:
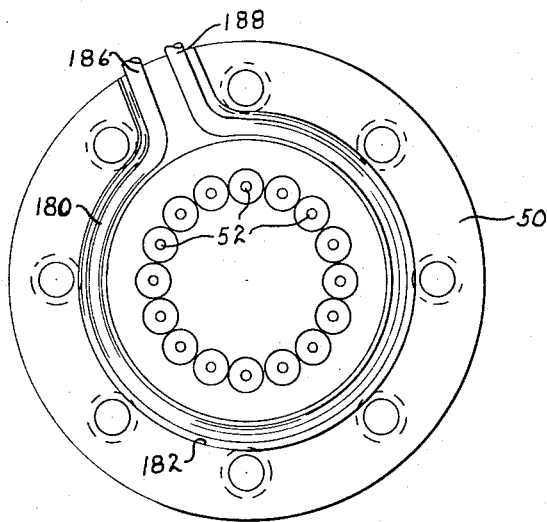
FIGURE 12 is an internal elevational view of the head plate, showing more clearly the manner in which the plate is cooled.

One of the important features of the present invention is the substantial cooling of the meal before it enters the extruding mechanism. In the embodiment of the invention illustrated in the drawings, the hopper is provided with a plurality of ducts 100 horizontally positioned and spaced from one another throughout the hopper for conveying cold air from the cooling system 36 through the meal as the meal sifts or otherwise moves downwardly in the hopper between the ducts. These ducts are generally of A-shaped cross sectional configuration in order to facilitate the moving of the meal over the external surfaces 102 and 104 from top to bottom. The lower side 106 of the ducts is open and contains a recessed bottom 108 and is connected to the internal portion 110 by a plurality of longitudinal slots 112. The cooled air in cooling system 36 passes through internal portion 110 and downwardly through longitudinal slots 112, and thence laterally where it contacts the meal passing downwardly through the hopper. The slots extend substantially the full length of the portion of the ducts in the hopper and evenly distribute the flow of air throughout the length of the ducts so that substantially uniform distribution of the air in the hopper and in contact with meal is obtained. The number of ducts 100 may be varied from one installation to another; however, in order to cool the meal effectively when the machine is operating at a relatively high rate of speed, the ducts should be disposed throughout most of the hopper area, such as illustrated in FIGURE 6. The ducts 100 extend through the hopper sides 114 and 116 and communicate with inlet conduit 118 and outlet conduit 120. The schematic diagram of FIGURE 10 illustrates the manner in which the air for the hopper is cooled, the system consisting of a main supply conduit 130, vertical conduits 132 and 132' connected at their lower ends to main conduit 130 and having cooling coils 134 and 134' in the lower ends thereof, and two fans 136 and 136' for forcing the air upwardly into horizontal conduit 138 which is connected at its outlet end to chamber 140 containing a fan 141. The chamber is connected to inlet manifold 118 of the hopper by conduits 142 and 143. The outlet manifold 120 of the hopper is connected to main conduit 130 by conduits 144 and 145, thus providing a means for re-circulating the air continuously through the system. As pointed out previously, some of the air passes outwardly through the lower portion of ducts 100 and in order to replace this air, valve controlled intake passages 146 and 146' are provided to admit sufficient air to replace the air passing into the meal from the lower edge of the ducts.

The refrigerating system for cooling coils 134 is mounted in the lower portion of frame 80 and includes compressor 150 and coils 152. The details of compressor 150, coils 134 and coils 152 will not be described in detail herein inasmuch as the structure of these components is well known and these components are readily available on the market.

In order to control the temperature effectively from the inlet to the outlet of the machine, the housing contains a cooling system consisting, in the embodiment of the invention illustrated in the drawings, of two cooling plates 160 and 162 bolted or otherwise secured firmly to opposite sides of housing 40. Each of these cooling plates contains a series of passages 164 extending upwardly and downwardly in relatively close relationship and connected alternately at the lower and upper ends to the adjacent vertical passages. The inlet of passage 164 is connected by a conduit 166 to cooling system 38 and the outlet of the passage in plate 160 is connected to the inlet of the same cooling system by conduit 168. The passages in the two cooling plates are connected in series to one another by a conduit 170 which passes through the forward part of housing 40. Since the two cooling plates are secured to the sides of the housing in direct metal-to-metal contact, effective transfer of heat from the housing to the cooling plates, and thence to the coolant in passages 164, is obtained. In the embodiment of the invention illustrated in the drawings, the cooling system for the two plates 160 and 162 consists of a water tank 172 in which is disposed a series of refrigerator coils for cooling the water to the desired temperature. The water is circulated from the tank to the inlet conduit 166 by motor and pump unit 174 connected to the lower portion of the tank by a conduit and to the inlet of passage 164 by conduit 166. The circulation of the water through the cooling plates 160 and 162 is preferably controlled by a thermostatic unit which turns on and turns off motor 174 to control the effective temperature of housing 40.

A further cooling operation is performed in the extruder mechanism by a cooling coil 180 mounted in a groove 182 in the inner side of head plate 50. Water is likewise circulated through coil 180 from tank 172 by a motor and pump unit 184 having the inlet of the pump connected to the conduit at the lower end of tank 172 and the other end to inlet 186 of cooling coil 180. The outlet 188 drains into tank 172 for re-cooling and recirculating through the systems for the housing and head plate. A thermostatic element responsive to the temperature of the coolant in coil 180 for starting up and shutting down the pump unit 184 is preferably included in the system, in order to maintain the desired temperature in the head plate. While water has been used as the medium for dissipating the heat in housing 40 and head plate 50, refrigerant coils may be used in their place if desired, thus eliminating the need for water tank 172.

Since the hopper is relatively large and spaced relatively close to the upper end of the extruder mechanism, a screw conveyor is disposed horizontally in a trough 190 and is driven by a motor and gear reduced unit 192 to constantly push the meal from the lower portion of the hopper through opening 194 and to inlet passage 46 of the extruder mechanism. A small amount of moisture may be added to the meal between the hopper and the extruder mechanism, preferably at the outlet 194. Other means of providing the required amount of moisture may be used, as will be more fully explained hereinafter.

The material, as it emerges from the extrusion holes in plate 50, puffs and is cut by knife 26 and caught in a guard 200 consisting of a frame 202, mesh material 204 and a conical chute 206 in the bottom thereof. The material flies in all directions as it is cut by rotating knives 90 and 92, and hits the mesh and/or chute and falls into and through chute 206 into a conduit 208, and thence to conveyor 28. The conveyor 28 consists of a horizontal passage 210 and a blower 212 which discharges air into end 214 of conduit 210. The material falling from conduit 208 is deflected by a baffle 216 forwardly away from blower 212 and is propelled forward by the air from blower 212 and discharged from conduit 210 into a packaging machine or storage bin or hopper. The mesh in guard 200 permits the steam from the moisture in the meal to readily escape rather than to be carried through conveyor 28. Since it is necessary to readily reach the head plate for starting and stopping of the machine and to service it from time to time, the guard unit is preferably hinged onto the housing so that it can be easily swung between open and closed positions.

The meal may be carried in bags or containers to the top of the hopper and poured directly thereinto; however, in view of the weight of the meal and the height of the machine above the floor on which it is mounted, a conveyor mechanism such as that shown at numeral 30 is preferably used. The conveyor mechanism may be of any suitable type, the one shown consisting of a bucket and belt type driven by motor 220 which in turn drives a screw 222 extending horizontally across the top of the conveyor for distributing the meal discharged by the conveyor uniformly over the top of the hopper. Various types of conveyors and distributors may be used, depending upon the nature of the particular installation. The meal is fed into the conveyor through a bin 230 and is elevated by the buckets in the conveyor and discharged through chute 232 to the end of screw conveyor 222 which is driven by a belt 234 from the drive for the conveyor. The conveyor may be timed to operate manually as required or may be controlled automatically to discharge at a constant rate, depending upon the speed at which the present machine uses the meal.

Control of the machine is substantially automatic from the beginning to the end of the operation, and a control panel 240 for controlling the operation is preferably mounted on the machine where it can readily be observed and operated by the operator of the machine. The controls for maintaining the proper temperature in the hopper, extruder housing and head plate are controlled through the control panel and are operated to give the desired temperature over long periods of time without interrupting the operation of the machine.

In the operation of the present machine, meal is placed in the bin or chute 230, lifted by conveyor 30 to the hopper where it is distributed in the hopper by feed screw 222. When the machine is initially started, the meal is permitted to remain in the hopper for a period of time before the extruding mechanism is started to afford ample time for the meal to be cooled to the desired temperature. After the meal has been placed in the hopper, but before the extruder has been started, the cooling system for the hopper is placed in operation by starting the refrigerator system for cooling coils 134 and starting the fans for circulating the cool air through the system, including ducts 100. After the meal has remained in the hopper sufficiently long to cool the meal to the proper temperature, the head plate 50 is heated to the proper operating temperature of about 212° F. Motor 60 is then started to drive shaft 68 and screw 44, and the meal is discharged from the hopper through opening 194 into inlet conduit 46 to the screw 44. The screw propels the cooled meal through chamber 42 to the head plate, forcing it through holes 52 of the plate at a sufficient temperature and under sufficient pressure to gelatinize the starch and vaporize the moisture. As the material emerges from holes 52, the moisture causes the material to puff into a finger-like, gelatinized product which is cut by blades 90 and 92 of knife 26 into the desired lengths.

Once the machine has been placed in operation, the friction and pressure created in and around the screw and in the holes in the head plate are sufficient to maintain the temperature above the 212° F. operating temperature. This temperature normally tends to rise and, if not controlled, may reach a point where the material becomes scorched or fails to puff satisfactorily. When the temperature begins to rise, the controls place the cooling system for the housing and head plate in operation, thereby maintaining the housing and head plate at proper operating temperatures. The machine maintained under these conditions with the pre-cooled meal can be operated at relatively high operating speeds for long periods of time to produce a satisfactory product. As the material moves downwardly through the hopper while the machine is in operation, it is adequately cooled by the air in ducts 100, and this cooled meal either alone or in combination with the cooled housing and/or head plate maintains the optimum temperature for producing quality product. The material, upon being cut by knife 26, falls into conduit 208, and thence into conveyor 28 and is carried by the air from blower 212 to the packaging machine or storage bin.

The meal supplied by the mills may or may not contain sufficient moisture to give satisfactory puffing to the product as it emerges from the extrusion holes. Consequently, if the meal has insufficient moisture, additional moisture is added before the material is introduced into the extruding mechanism. This may be done by a humidifier placed between the hopper and the extruding mechanism; however in the present cooling system, the lower temperatures in the hopper cause some condensation around the ducts and in the conduit between the hopper and the extruding mechanism which may be sufficient to provide the additional moisture. If not, the additional moisture may be added by introducing into the cooling system a mist which is discharged along with the cooled air into the meal in the hopper from the lower side of ducts 100. This manner of introducing the additional moisture into the meal gives effective distribution of the moisture therein, so that a uniform quality in the final product will be obtained.

While only one embodiment of the machine has been described in detail herein, various changes and modifications may be made without departing from the scope of the invention.

We claim:
1. A machine for extruding and puffing cereal, comprising an extruding mechanism having a housing with a bore, a screw in said bore, a head plate across the end of said bore containing an extrusion hole communicating with said bore, said bore having an inlet passage, a channel means for supplying cereal to the inlet passage of said extruding mechanism, said channel means having a gravity feed portion, and means in the gravity feed portion of said channel means forming two sets of flow passages through one of which the cooling fluid flows and through the other of which the cereal flows for cooling the cereal before it enters said inlet passage.

2. A cereal extruding and puffing machine as defined in claim 1, in which the channel means for supplying cereal to the inlet passage of the extruding mechanism includes a hopper, and the means for cooling the meal is disposed in said hopper.

3. A cereal extruding and puffing machine as defined in claim 2, in which the cooling means consists of a plurality of horizontally disposed ducts spaced from one another throughout a substantial portion of the hopper for conveying cooled air through the hopper.

4. A cereal extruding and puffing machine as defined in claim 2, in which the cooling means in the hopper consists of a conduit having a cooling fluid therein passing therethrough.

5. A cereal extruding and puffing machine as defined in claim 4, in which the ducts are of generally A-shaped cross section with openings in the bottom thereof for discharging cooled air into the meal.

6. A cereal extruding and puffing machine as defined in claim 1, in which a means is provided for cooling said housing.

7. A cereal extruding and puffing machine as defined in claim 6, in which a series of passages are disposed in the proximity of said bore of said housing for conducting a cooling fluid therein.

8. A cereal extruding and puffing machine as defined in claim 7, in which a water cooling system is provided for the housing cooling means.

9. A cereal extruding and puffing machine as defined in claim 1, in which a cooling passage is provided in said head plate for conducting a cooling fluid therethrough.

10. A cereal extruding and puffing machine as defined in claim 9, in which a water cooling system is provided for the head plate cooling means.

11. A cereal extruding and puffing machine as defined in claim 1, in which said machine includes an extruding mechanism having a housing with a bore, a screw in said bore, a head plate across the end of said bore containing an extrusion hole communicating with said bore, said bore having an inlet passage, a hopper for feeding cereal to said inlet passage, a cooling means in said hopper consisting of a plurality of conduits extending through the hopper for cooling the meal, a means for cooling said housing, and a means for cooling said head plate.

References Cited
UNITED STATES PATENTS

| | | | |
|---|---|---|---|
| 1,157,172 | 10/1915 | Morris | 34—65 |
| 1,758,272 | 5/1930 | Anderson | 99—238 |
| 2,291,212 | 7/1942 | Clinefelter. | |
| 2,641,797 | 6/1953 | Waltman | 17—32 |
| 2,701,920 | 2/1955 | Campbell | 34—65 |
| 2,915,957 | 12/1959 | Bowman | 99—238 |
| 2,931,408 | 4/1960 | Dwyer et al. | 107—14 |
| 3,062,657 | 11/1962 | Vollink. | |

WALTER A. SCHEEL, *Primary Examiner.*

J. M. NEARY, *Assistant Examiner.*